United States Patent
Iida et al.

(10) Patent No.: US 9,489,043 B2
(45) Date of Patent: Nov. 8, 2016

(54) DISPLAY DEVICE AND CONTROLLING METHOD

(71) Applicant: Sony Corporation, Tokyo (JP)

(72) Inventors: Yuuichi Iida, Tokyo (JP); Shinichi Hayashi, Ichinomiya (JP); Yusuke Sakai, Tokyo (JP); Junji Oi, Tokyo (JP); Daijiro Sakuma, Tokyo (JP); Shingo Tsurumi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 31 days.

(21) Appl. No.: 14/589,107

(22) Filed: Jan. 5, 2015

(65) Prior Publication Data

US 2015/0185830 A1    Jul. 2, 2015

Related U.S. Application Data

(63) Continuation of application No. 13/395,035, filed as application No. PCT/JP2010/062311 on Jul. 22, 2010, now Pat. No. 8,952,890.

(30) Foreign Application Priority Data

Sep. 15, 2009   (JP) ................................. 2009-213377

(51) Int. Cl.
G09G 5/00    (2006.01)
G06F 3/01    (2006.01)
(Continued)

(52) U.S. Cl.
CPC ................. *G06F 3/011* (2013.01); *G09G 3/20* (2013.01); *H04N 5/64* (2013.01); *H04N 9/64* (2013.01);
(Continued)

(58) Field of Classification Search
CPC ............. G09G 3/20; G09G 2320/028; G09G 2354/00; G06F 3/011; G06K 2009/00322; H04N 5/64; H04N 21/4223; H04N 21/4314; H04N 21/440263; H04N 21/44218; H04S 7/301; H04S 7/303
See application file for complete search history.

(56) References Cited

U.S. PATENT DOCUMENTS 4,973,149 A   11/1990 Hutchinson
5,258,586 A   11/1993 Suzukib et al.
(Continued)

FOREIGN PATENT DOCUMENTS

EP   1 426 919 A1   6/2004
EP   1 566 788 A2   8/2005
(Continued)

OTHER PUBLICATIONS

Combined Chinese Office Action and Search Report issued Jan. 14, 2015 in Patent Application No. 201080048006.6 (with English Translation).
(Continued)

*Primary Examiner* — Joe H Cheng
(74) *Attorney, Agent, or Firm* — Oblon, McClelland, Maier & Neustadt, L.L.P.

(57) ABSTRACT

An image display device and controlling method capable of optimizing a state of the image display device for a user at a desired position. The display device includes: an imaging section that takes an image of a predetermined range of a dynamic image with respect to an image display direction; an image analyzing section that analyzes the dynamic image taken by the imaging section and calculates a position of a user; a system optimization processing section that calculates system control information for optimizing a system based on the position of the user calculated by the image analyzing section; and a system controlling section that optimizes the system based on the system control information calculated by the system optimization processing section.

18 Claims, 15 Drawing Sheets

(51) Int. Cl.
*H04N 5/64* (2006.01)
*H04N 21/4223* (2011.01)
*H04N 21/431* (2011.01)
*H04N 21/4402* (2011.01)
*H04N 21/442* (2011.01)
*G09G 3/20* (2006.01)
*H04N 9/64* (2006.01)
*H04S 7/00* (2006.01)
*G06K 9/00* (2006.01)

(52) U.S. Cl.
CPC ...... *H04N 21/4223* (2013.01); *H04N 21/4314* (2013.01); *H04N 21/44218* (2013.01); *H04N 21/440263* (2013.01); *H04S 7/301* (2013.01); *G06K 2009/00322* (2013.01); *G09G 2320/028* (2013.01); *G09G 2354/00* (2013.01); *H04S 7/303* (2013.01)

(56) References Cited

U.S. PATENT DOCUMENTS

| | | | |
|---|---|---|---|
| 6,084,367 A | 7/2000 | Landert | |
| 6,215,471 B1 | 4/2001 | DeLuca | |
| 6,243,076 B1 | 6/2001 | Hatfield | |
| 6,611,297 B1 * | 8/2003 | Akashi | H04N 21/4131 348/602 |
| 6,863,609 B2 | 3/2005 | Okuda et al. | |
| 7,117,380 B2 | 10/2006 | Kangas | |
| 7,627,139 B2 | 12/2009 | Marks et al. | |
| 7,834,912 B2 | 11/2010 | Yoshinaga et al. | |
| 7,986,424 B2 | 7/2011 | Sato et al. | |
| 8,085,243 B2 | 12/2011 | Yamashita et al. | |
| 8,199,108 B2 | 6/2012 | Bell | |
| 8,230,367 B2 | 7/2012 | Bell et al. | |
| 8,233,033 B2 * | 7/2012 | Aarts | G06F 1/1601 345/5 |
| 8,400,322 B2 | 3/2013 | Acedo et al. | |
| 9,288,387 B1 * | 3/2016 | Keller | H04N 21/44218 |
| 2001/0012001 A1 | 8/2001 | Rekimoto et al. | |
| 2002/0105482 A1 | 8/2002 | Lemelson et al. | |
| 2004/0160386 A1 | 8/2004 | Michelitsch et al. | |
| 2005/0197923 A1 | 9/2005 | Kilner et al. | |
| 2005/0253807 A1 | 11/2005 | Hohmann et al. | |
| 2006/0139314 A1 | 6/2006 | Bell | |
| 2006/0227103 A1 | 10/2006 | Koo et al. | |
| 2007/0126884 A1 | 6/2007 | Xu et al. | |
| 2008/0088437 A1 | 4/2008 | Aninye et al. | |
| 2008/0118152 A1 | 5/2008 | Thorn et al. | |
| 2009/0251458 A1 | 10/2009 | Kondo et al. | |
| 2009/0315869 A1 | 12/2009 | Sugihara et al. | |
| 2011/0116685 A1 * | 5/2011 | Sugita | H04N 5/23219 382/103 |
| 2011/0135114 A1 | 6/2011 | Oba et al. | |
| 2011/0237324 A1 * | 9/2011 | Clavin | G06K 9/00369 463/29 |
| 2011/0254691 A1 | 10/2011 | Ooi et al. | |
| 2012/0114137 A1 | 5/2012 | Tsurumi | |
| 2012/0206340 A1 | 8/2012 | Mori et al. | |

FOREIGN PATENT DOCUMENTS

| | | |
|---|---|---|
| JP | 05 137200 | 6/1993 |
| JP | 09 247564 | 9/1997 |
| JP | 2005 44330 | 2/2005 |
| JP | 2007 065766 | 3/2007 |
| JP | 2008 172817 | 7/2008 |
| JP | 2009 094723 | 4/2009 |

OTHER PUBLICATIONS

International Search Report issued on Aug. 17, 2010 in PCT/JP10/062311 filed on Jul. 22, 2010.
Japanese Office Action issued Mar. 19, 2013 in Patent Application No. 2009-213377.
Extended European Search Report issued Jan. 8, 2013 in Patent Application No. 10816968.1.
European Office Action issued May 4, 2016 in European Application No. 10 816 968.1 (9 pages).

* cited by examiner

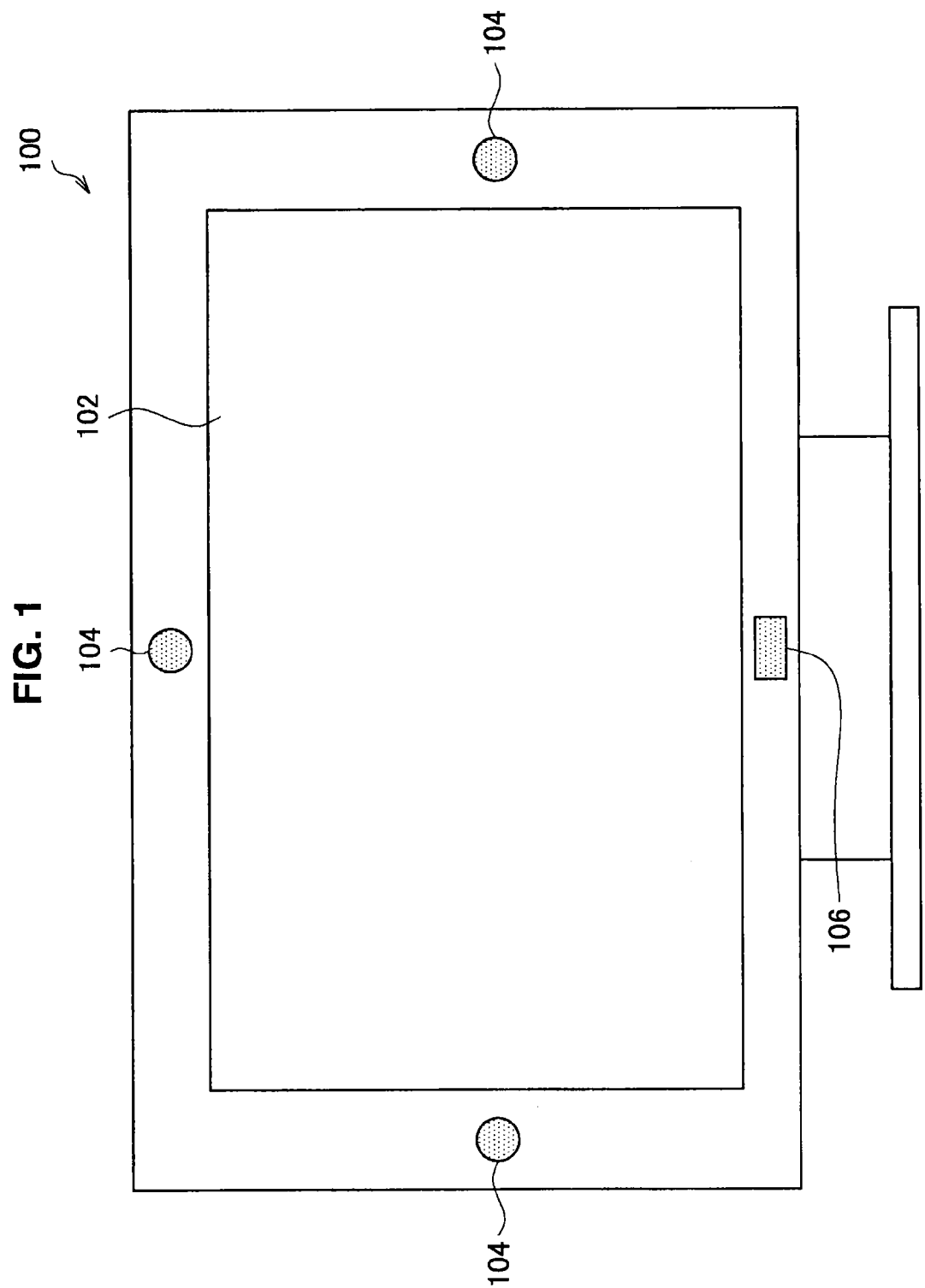

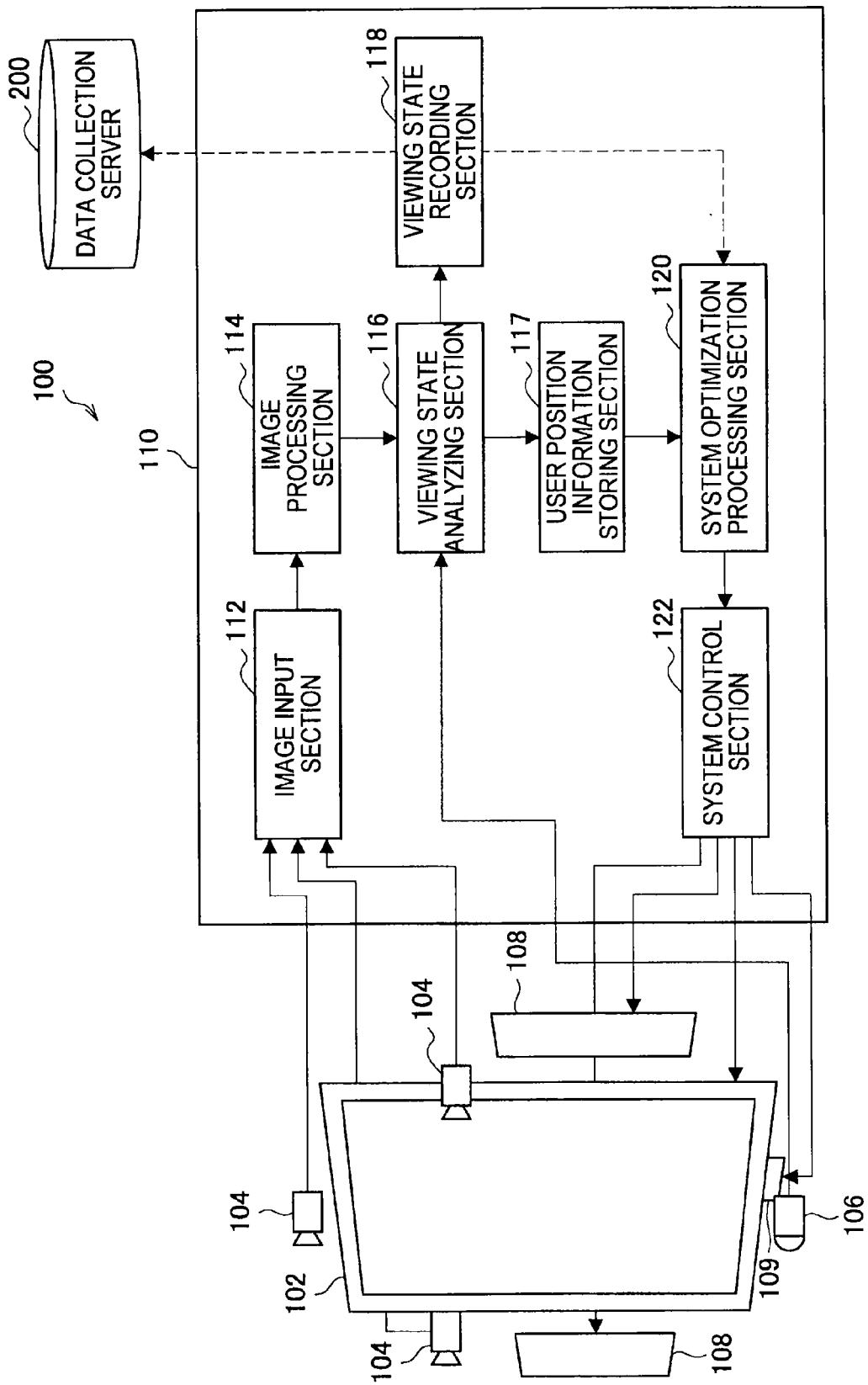

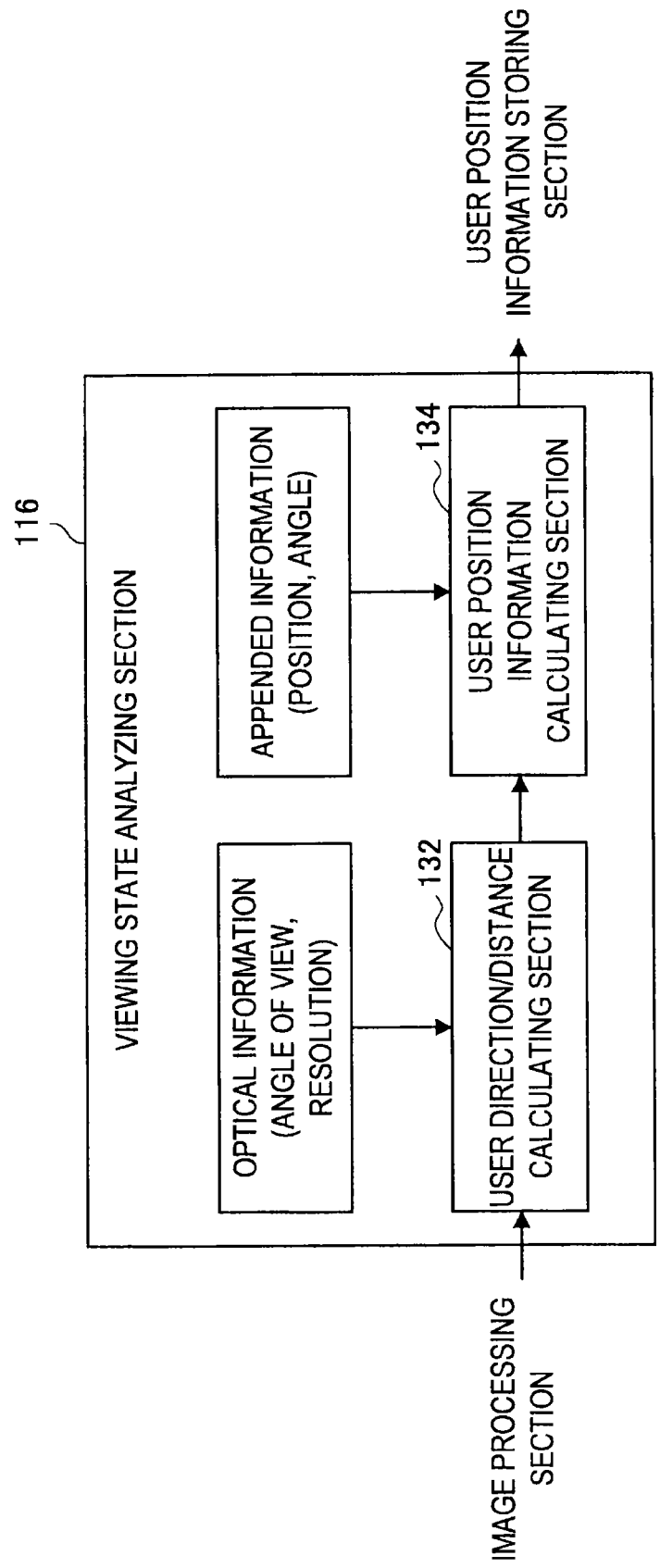

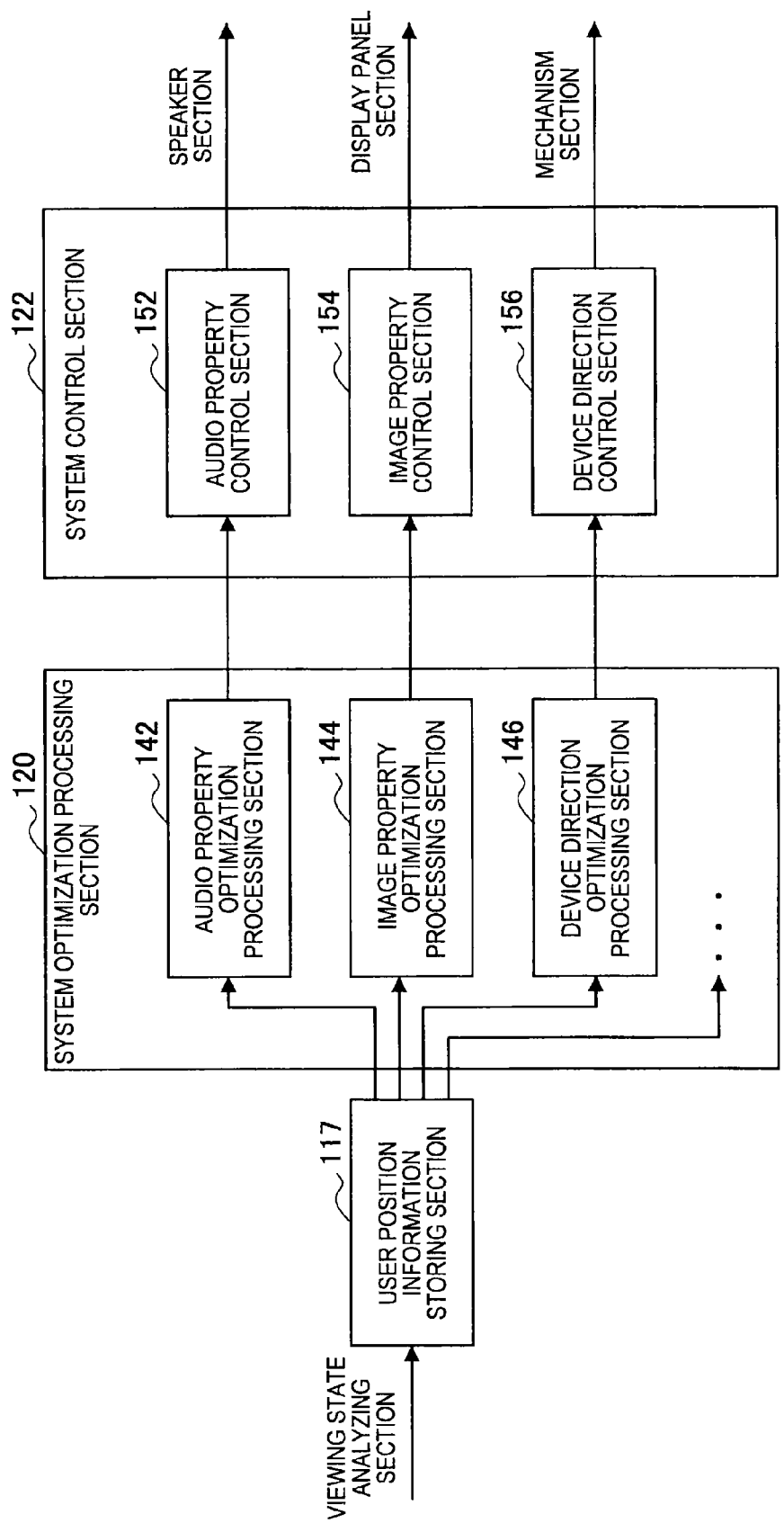

USER 1
[a1, b1],[w1,h1]

USER 2
[a2, b2],[w2,h2]

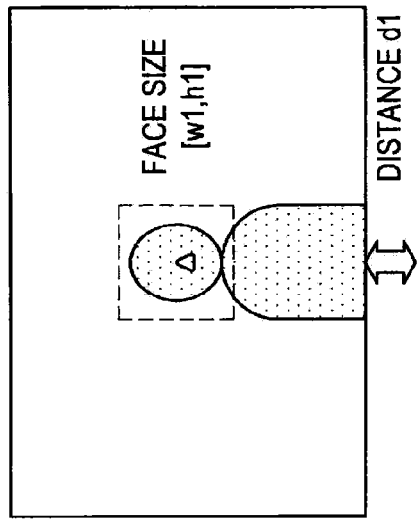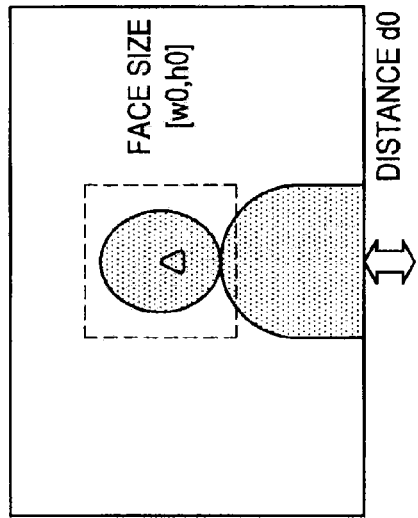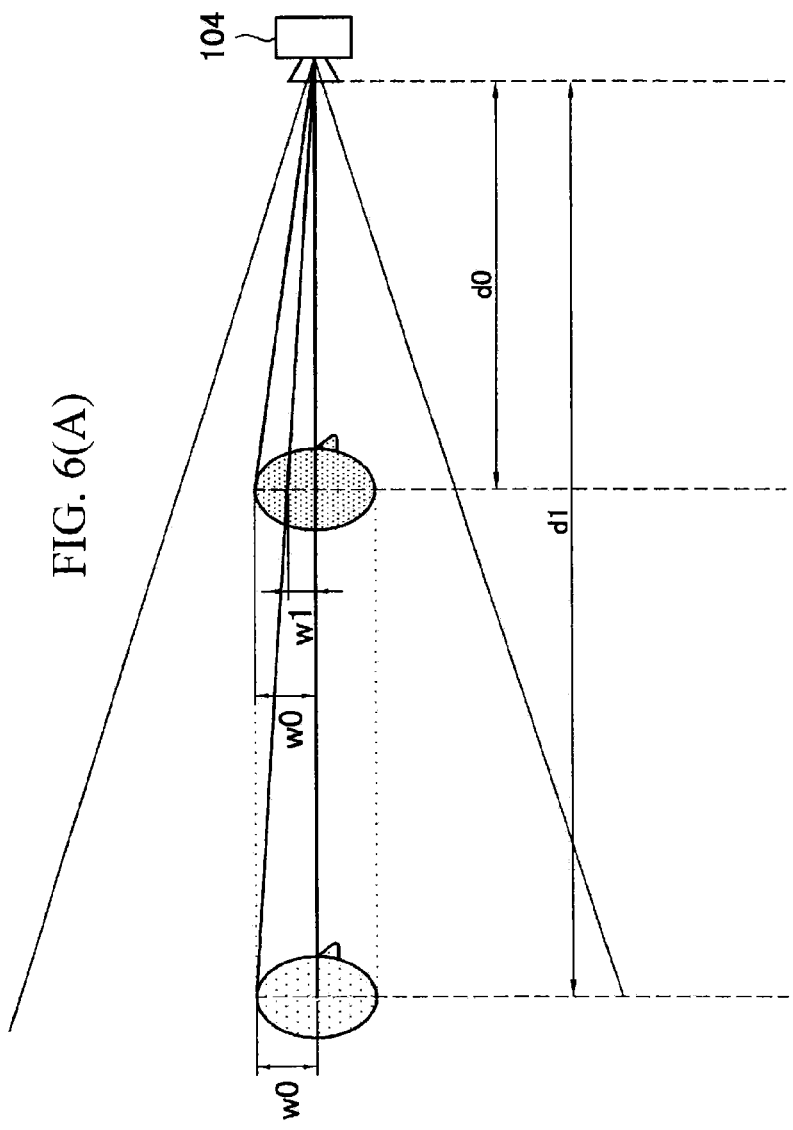

HORIZONTAL DIRECTION

VERTICAL DIRECTION

DISPLAY DEVICE AND CONTROLLING METHOD

CROSS REFERENCE TO RELATED APPLICATIONS

This application is a continuation of U.S. application Ser. No. 13/395,035, filed Jun. 21, 2012, which is a National Stage of PCT/JP2010/062311, filed Jul. 22, 2010, which claims the benefit of priority to Japanese Patent Application No. 2009-213377, filed Sep. 15, 2009, the contents of which is incorporated in its entirety.

TECHNICAL FIELD

The present invention relates to a display device and a controlling method.

BACKGROUND ART

In the recent years, accompanying an expansion of a flat-screen television market, demands for an image display device such as a large screen television for installing in for example a living room is increasing. In such a situation, an image display device having various functions is being proposed.

SUMMARY OF INVENTION

Technical Problem

Incidentally, since a user can watch an image that an image display device is displaying at any desired position, depending on a viewing position of the user, a state of the image display device, namely an audio property such as a volume balance of sound output from an audio output section, an image property of an image display section of the image display device and display contents, a displaying direction of the image display device and the like may not be optimal for the user at the desired position.

Thus, the present invention has been made in view of the above problem, and an aim of the present invention is to provide a novel and improved image display device and controlling method capable of optimizing the state of the image display device for the user at the desired position.

Solution to Problem

To solve the above problem, according to an aspect of the present invention, a display device including an imaging section that takes an image of a predetermined range of a dynamic image with respect to an image display direction; an image analyzing section that analyzes the dynamic image taken by the imaging section and calculates a position of a user; a system optimization processing section that calculates system control information for optimizing a system based on the position of the user calculated by the image analyzing section; and a system controlling section that optimizes the system based on the system control information calculated by the system optimization processing section is provided.

The system optimization processing section may calculate system control information for optimizing a volume balance of sound output from an audio output section based on the position of the user calculated by the image analyzing section.

The system optimization processing section may calculate system control information for optimizing an image property of an image display section based on the position of the user calculated by the image analyzing section.

The system optimization processing section may calculate system control information for optimizing display contents of an image display section based on the position of the user calculated by the image analyzing section.

The system optimization processing section may calculate system control information for optimizing a device direction of the display device itself based on the position of the user calculated by the image analyzing section.

The image analyzing section may analyze the dynamic image taken by the imaging section and calculate a three-dimensional position of the user.

The image analyzing section may analyze the dynamic image taken by the imaging section and calculate respective positions of a plurality of users, and the system optimization processing section may calculate positions of center of balance of the plurality of users based on the positions of the plurality of users calculated by the image analyzing section, and calculate system control information for optimizing a system based on the calculated positions of center of balance of the plurality of users.

Further, to solve the above problem, according to another aspect of the present invention, a controlling method including an imaging step of taking an image of a predetermined range of a dynamic image with respect to an image display direction; an image analyzing step of analyzing the taken dynamic image and calculating a position of a user; a system optimization processing step of calculating system control information for optimizing a system based on the calculated position of the user; and a system controlling step of optimizing the system based on the calculated system control information is provided.

Advantageous Effects of Invention

As explained above, according to the present invention, a novel and improved image display device and controlling method capable of optimizing the state of the image display device for the user at the desired position can be provided.

BRIEF DESCRIPTION OF DRAWINGS

FIG. 1 is an explanatory diagram that explains an outer appearance of an image display device 100 in an embodiment of the present invention.

FIG. 2 is an explanatory diagram that explains a configuration of the image display device 100 of the embodiment of the present invention.

FIG. 3 is an explanatory diagram that explains a configuration of a control section 110.

FIG. 4 is an explanatory diagram that explains the configuration of the control section 110.

FIG. 6(A) is an explanatory diagram for explaining a case where users are present at a reference distance d0 and a distance d1 in the imaging area of the imaging section 104, FIG. 6(B) is an explanatory diagram for explaining the face size [w1, h1] of the user at the distance d1 in the image taken by the imaging section 104, and FIG. 6(C) is an explanatory diagram for explaining a reference face size [w0, h0] of the user at the reference distance d0 in the image taken by the imaging section 104.

DESCRIPTION OF EMBODIMENTS

Figure 5A:
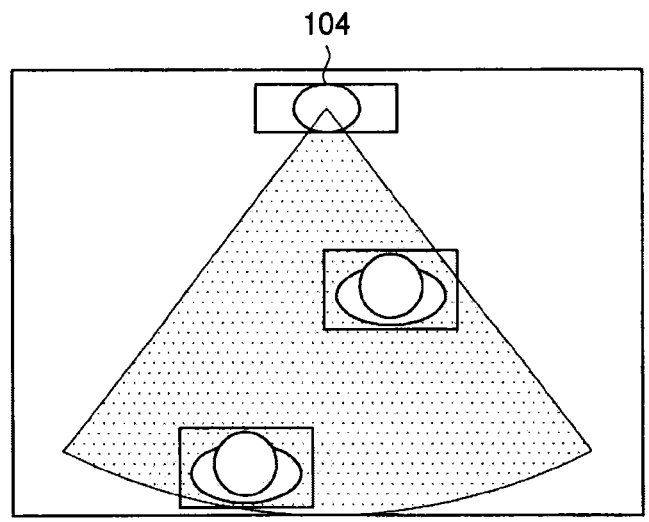
FIG. 5(A) is an explanatory diagram for explaining a case where a user 1 and a user 2 are present in an imaging area of an imaging section 104.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that, explanation will be given in the following order.

<1. One Embodiment of the Present Invention>
[1-1. Configuration of Image Display Device]
[1-2. Configuration of Control Section]
[1-3. Optimization Process according to User Position]
[1-4. Optimization Process according to User Positions of One or More Users]
[1-5. Optimization Process according to Ages of One or More Users]

1. One Embodiment of the Present Invention

[1-1. Configuration of Image Display Device]

Firstly, a configuration of an image display device of an embodiment of the present invention will be explained. FIG. 1 is an explanatory diagram that explains an outer appearance of an image display device 100 in the embodiment of the present invention. FIG. 1 is a front view diagram in viewing the image display device 100 from a front side. Hereinbelow, the outer appearance of the image display device 100 of the embodiment of the present invention will be explained with reference to FIG. 1.

As shown in FIG. 1, the image display device 100 of the embodiment of the present invention includes imaging sections 104 that take a dynamic image arranged at an upper center position and left and right center positions of a display panel section 102 that displays a still image or a dynamic image. The imaging sections 104 take the dynamic image with respect to a direction by which the image display device 100 displays the still image or the dynamic image in the display panel section 102. The image display device 100 of the embodiment analyzes an image taken by the imaging sections 104, and detects a face of a user taken in the image. The image display device 100 analyzes the detected face of the user, and detects a face detecting position and a face size. The image display device 100 calculates a relative position of the user with respect to an optical axis of a camera of the respective imaging sections 104 based on the detected face detecting position and face size. Then, the image display device 100 calculates a position of the user with respect to a device center and a frontward axis of the image display device 100 based on a calculation result of the relative position of the user with respect to the optical axis of the camera of the respective imaging sections 104 and appended information such as a position, an angle of the camera of the respective imaging sections 104. The image display device 100 of the embodiment characteristically optimizes a state of the image display device 100 in accordance with the position of the user; that is, an audio property such as sound volume, an image property, display contents, a device direction with respect to the position of the user.

Further, the image display device 100 of the embodiment includes a sensor section 106 arranged at a lower center position of the display panel section 102. The sensor section 106 detects presence/absence of a person in front of the image display device 100.

Note that, in FIG. 1, although the image display device 100 had the imaging sections 104 that take the dynamic image at three portions around the display panel section 102, it is needless to say that positions of the imaging sections 104 that take the dynamic image are not limited to the above example in the present invention; for example, a device independent from the image display device 100 may be provided, the device may be connected to the image display device 100, and the dynamic image may be taken by this device. Further, it is needless to say that a number of the imaging section 104 is not limited to three; images may be taken by providing two or less, or four or more imaging sections 104. Moreover, it is needless to say that a number of the sensor section 106 is not limited to one; and two or more sensor sections may be provided.

Further, although not shown in FIG. 1, the image display device 100 may further include a signal receiving section that can receive a control signal from a remote controller (not shown) through an infrared scheme, wireless scheme.

As above, the outer appearance of the image display device 100 of the embodiment of the present invention has been explained with reference to FIG. 1. Next, a configuration of the image display device 100 of the embodiment of the present invention will be explained.

FIG. 2 is an explanatory diagram that explains the configuration of the image display device 100 of the embodiment of the present invention. Hereinbelow, the configuration of the image display device 100 of the embodiment of the present invention will be explained with reference to FIG. 2.

As shown in FIG. 2, the image display device 100 of the embodiment of the present invention is configured by including the display panel section 102, the imaging sections 104, the sensor section 106, a speaker section 108, a mechanism section 109, and a control section 110.

Further, the control section 110 is configured by including an image input section 112, an image processing section 114, a viewing state analyzing section 116, a user position information storing section 117, a viewing state recording section 118, a system optimization processing section 120, and a system control section 122.

The display panel section 102 displays the still image or the dynamic image based on a panel drive signal. In the embodiment, the display panel section 102 displays the still image or the dynamic image using liquid crystals. Of course in the invention, it is needless to say that the display panel section 102 is not limited to the above example. The display panel section 102 may display the still image or the dynamic image using a self-emitting display device such as an organic EL (electroluminescence).

As described above, the imaging sections 104 are arranged at the upper center position and the left and right center positions of the display panel section 102 that displays the still image or the dynamic image. The imaging sections 104 take the dynamic image with respect to the direction by which the image display device 100 displays the dynamic image in the display panel section 102 when the panel drive signal is supplied to the display panel section 102 and the display panel section 102 is displaying the dynamic image. The imaging sections 104 may take the dynamic image by CCD (Charge Coupled Device) image sensors, or may take the dynamic image by CMOS (Complementary Metal Oxide Semiconductor) image sensors. The dynamic image taken by the imaging sections 104 is sent to the control section 110.

The sensor section 106 is provided at the lower center position of the display panel section 102 that displays the still image or the dynamic image, and is for example for detecting the presence/absence of a person in front of the image display device 100. Further, if a person is present in front of the image display device 100, the sensor section 106 can detect a distance between the image display device 100 and that person. A detection result and distance information by the sensor section 106 are sent to the control section 110. The speaker section 108 outputs sounds based on a sound outputting signal. The mechanism section 109 controls a displaying direction of the display panel 102 of the image display device 100 for example based on a drive signal.

The control section 110 controls operations of the image display device 100. Hereinbelow, respective sections of the control section 110 will be explained.

The image input section 112 receives the dynamic image taken in the imaging sections 104. The dynamic image received by the image input section 112 is sent to the image processing section 114, and is used in image processes in the image processing section 114.

The image processing section 114 is an example of an image analyzing section of the present invention, and performs the respective image processes on the dynamic image that is taken by the imaging sections 104 and sent from the image input section 112. The image processes performed by the image processing section 114 includes a detection process for an object included in the dynamic image taken by the imaging sections 104, a detection process for a number of persons included in the dynamic image, and a detection process for a face and a facial expression included in the dynamic image. Results of the respective image processes by the image processing section 114 are sent to the viewing state analyzing section 116, and are used for analyses of presence/absence of a person watching the image display device 100, and a viewing state and a viewing position of the person.

As for the face detection process to detect the face included in the image by the image processing section 114, techniques described for example in Japanese Patent Application Publication No. 2007-65766 and Japanese Patent Application Publication No. 2005-44330 can be used. Hereinbelow, the face detection process will briefly be explained.

In order to detect the face of the user from the image, firstly, a face position, a face size, and a face direction in the supplied image are respectively detected. By detecting the position and size of the face, a face image portion can be cut out from the image. Then, based on the cut-out face image and information of the face direction, feature portions of the face (facial feature positions), for example, eyebrows, eyes, nose, mouth, and the like, are detected. In the detection of the facial feature positions, for example, a method called an AAM (Active Appearance Models) may be adapted so as to be capable of detecting the feature positions.

When the facial feature positions are detected, a local feature value is calculated for each of the detected facial feature positions. By calculating the local feature values and storing the calculated local feature values together with the face image, face recognition becomes possible from the image taken by the imaging section 104. As for the method of face recognition, since techniques described for example in Japanese Patent Application Publication No. 2007-65766 and Japanese Patent Application Publication No. 2005-44330 can be used, thus a detailed description thereof will herein be omitted. Further, it is also possible to determine whether the face taken in the supplied image is a male or a female, and how old the person is, by the face image and the face feature position. Further, by predeterminedly recording information of faces, the person taken in the supplied image can be searched among the faces, and an individual can be specified.

The viewing state analyzing section 116 is an example of an image analyzing section of the present invention. It receives a result of the respective image processes by the image processing section 114 and a detection result and distance information by the detection of the sensor section 106, and performs an analysis of the viewing state and the viewing position of the person watching the image displayed by the image display device 100 by using the result of the respective image processes by the image processing section 114 and the detection result and the distance information by the detection of the sensor section 106. By the viewing state analyzing section 116 analyzing the viewing state and the viewing position of the person watching, the image display device 100 can control the audio property such as a sound balance of an output from the speaker section 108, control the image property of the display panel section 102, control the display contents of the display panel section 102, and control the display direction of the display panel section 102 by using the mechanism section 109 in accordance with the viewing position of the user watching the image display device 100. An analysis result of an analysis process by the viewing state analyzing section 116 is sent to the viewing state recording section 118, the user position information storing section 117 and the system optimization process section 120.

Note that, in a case where although a dynamic body is detected from the detection result and the distance information by the detection of the sensor section 106 but a distance between the sensor section 106 and that dynamic body is at or exceeding a predetermined distance, the viewing state analyzing section 116 can exclude that object from being a detection target.

The viewing state recording section 118 records the analysis result obtained by the analysis process by the viewing state analyzing section 116. The analysis result in the viewing state analyzing section 116 recorded by the viewing state recording section 118 is used in the system optimization process by the system optimization processing section 120. Further, the analysis result in the viewing state analyzing section 116 recorded by the viewing state recording section 118 may be sent to an external data collection server 200.

The user position information storing section 117 stores the analysis result of an analysis process by the viewing state analyzing section 116.

The system optimization processing section 120 calculates the system control information for performing the system optimization process on the respective sections of the image display device 100 by using the analysis result obtained by the analysis process of the viewing state analyzing section 116. The system optimization process on the respective sections of the image display device 100 includes the control of the audio property such as the sound balance of the output from the speaker section 108, the control of the image property of the display panel section 102, the control of the display contents of the display panel section 102, and the control of the display direction of the display panel section 102 of the image display device 100 by the mechanism section 109.

The image display device 100 can perform the optimization process in accordance with the position of the user based on the system control information calculated by the system optimization processing section 120. The system control information calculated by the system optimization processing section 120 is sent to the system control section 122.

The system control section 122 performs the system optimization process on the respective sections of the image display device 100 based on the system control information calculated by the system optimization processing section 120. For example, the system control section 122 performs the control of the volume balance of the output from the speaker section 108, the control of the image property of the display panel section 102, the control of the display contents of the display panel section 102, the control of the display direction of the display panel section 102 of the image display device 100 by the mechanism section 109 and the like based on the system control information calculated by the system optimization processing section 120.

As above, the configuration of the image display device 100 of the embodiment of the present invention has been explained with reference to FIG. 2. Next, a configuration of the control section 110 included in the image display device 100 of the embodiment of the present invention will be explained in more detail.

[1-2. Configuration of Control Section]

FIG. 3 is an explanatory diagram that explains the configuration of the control section 110 included in the image display device 100 of the embodiment of the present invention. Within the control section 110, FIG. 3 explains a configuration of the viewing state analyzing section 116 included in the control section 110. Hereinbelow, the configuration of the viewing state analyzing section 116 will be explained with reference to FIG. 3.

As shown in FIG. 3, the viewing state analyzing section 116 is configured by including a user direction/distance calculating section 132 and a user position information calculating section 134.

Figure 5B:
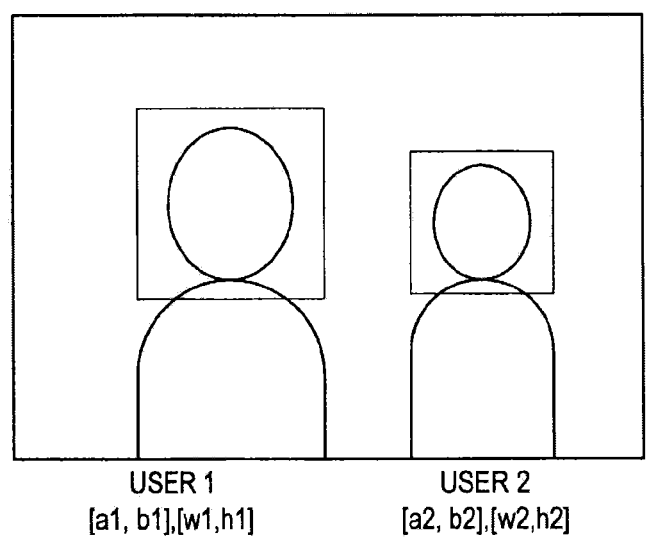
FIG. 5(B) is an explanatory diagram for explaining a face detecting position [a1, b1] and a face size [w1, h1] of the user 1, and a face detecting position [a2, b2] and a face size [w2, h2] of the user 2 that are included in an image taken by the imaging section 104.

The user direction/distance calculating section 132 receives the results of the respective image processes by the image processing section 114 and optical information such as information of an angle of view and a resolution of each camera of the imaging sections 104, and calculates a relative position of the user (direction [$\phi1$, $f1$], distance d1) with respect to the optical axis of each camera of the imaging sections 104 by using the results of the respective image processes by the image processing section 114 and the optical information from the imaging sections 104. Here, the taken image, as well as face detection information (for example, information such as the face detecting position [a1, b1], the face size [w1, h1], and other attribute information such as the age and sex) for each user using the image display device 100 are sent from the image processing section 114 to the user direction/distance calculating section 132 of the viewing state analyzing section 116. FIG. 5(A) is an explanatory diagram for explaining a case where a user 1 and a user 2 are present in the imaging area of the imaging section 104, and FIG. 5(B) is an explanatory diagram for explaining the face detecting position [a1, b1] and the face size [w1, h1] of the user 1, and the face detecting position [a2, b2] and the face size [w2, h2] of the user 2 that are included in the image taken by the imaging section 104. Further, FIG. 6(A) is an explanatory diagram for explaining a case where users are present at a reference distance d0 and a distance d1 in the imaging area of one of the imaging sections 104, FIG. 6(B) is an explanatory diagram for explaining the face size [w1, h1] of the user at the distance d1 in the image taken by the imaging section 104, and FIG. 6(C) is an explanatory diagram for explaining a reference face size [w0, h0] of the user at the reference distance d0 in the image taken by the imaging section 104.

The direction [$\phi1$, $\theta1$] is calculated as follows from the face detecting position [a1, b1] normalized by a taken image size [xmax, ymax] and the angle of view [$\phi0$, $\theta0$] of the camera of the imaging section 104.

Horizontal direction: $\phi1=\phi0*a1$

Vertical direction: $\theta1=\theta0*b1$

Further, the distance d1 is calculated as follows from the reference face size [w0, h0] at the reference distance d0.

Distance: $d1=d0*(w0/w1)$

Figure 7A:
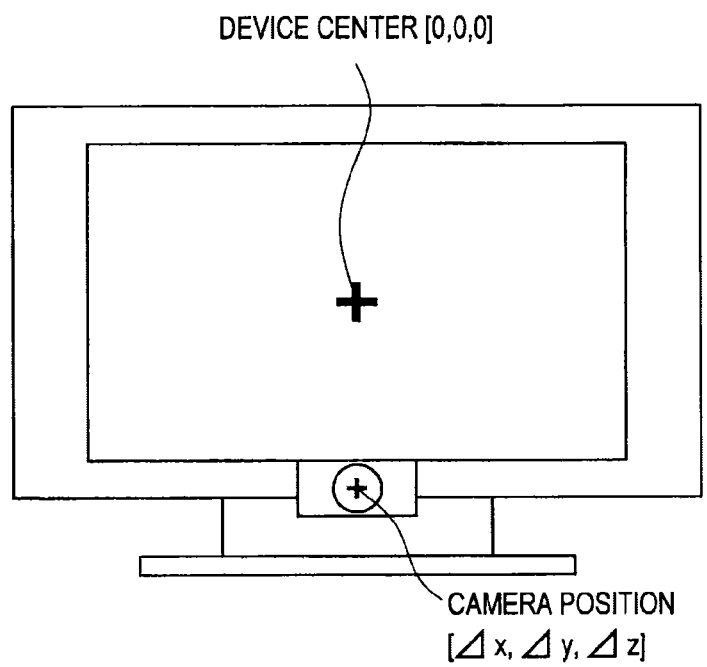
FIG. 7(A) is an explanatory diagram for explaining a device center [0, 0, 0] of the image display device 100 and a camera position [Δx, Δy, Δz] of the imaging section 104.
Figure 7B:
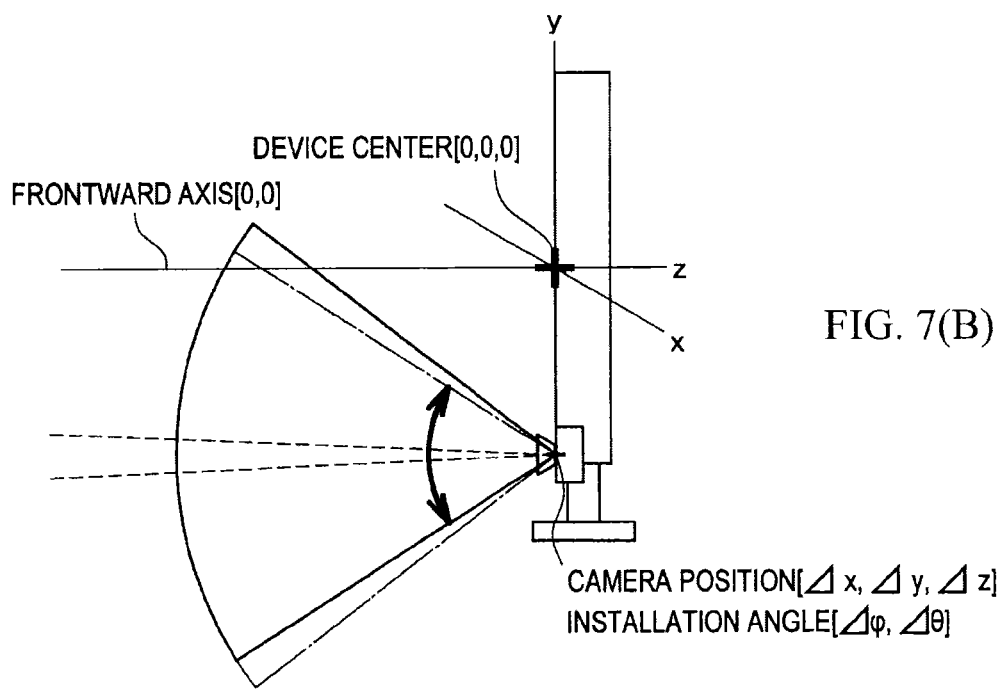
FIG. 7(B) is an explanatory diagram for explaining the device center [0, 0, 0] of the image display device 100, a frontward axis [0, 0], the camera position [Δx, Δy, Δz] of the imaging section 104, and an installation angle [Δϕ, Δθ].

The user position information calculating section 134 receives a calculation result of the relative position of the user with respect to the optical axis of the camera of the respective imaging sections 104 by the user direction/distance calculating section 132 and the appended information such as the position, the angle of the camera of the respective imaging sections 104, and calculates a three-dimensional position of the user with respect to the device center of the image display device 100 and the frontward axis by using the calculation result of the relative position of the user by the user direction/distance calculating section 132 and the appended information of the respective imaging sections 104. The user position information calculated by the user position information calculating section 134 is sent to the user position information storing section 117. FIG. 7(A) is an explanatory diagram for explaining the device center [0, 0, 0] of the image display device 100 and a camera position [Δx, Δy, Δz] of the imaging section 104, and FIG. 7(B) is an explanatory diagram for explaining the device center [0, 0, 0] of the image display device 100, the frontward axis [0, 0], the camera position [Δx, Δy, Δz] of the imaging section 104, and an installation angle [Δϕ, Δθ].

When the relative position of the user with respect to the optical axis of the camera of the imaging section 104 is of the direction [ϕ1, θ1] and distance d1, the device center of the image display device 100 is [0, 0, 0], and, with respect to the frontward axis [0, 0], a positional difference [Δx, Δy, Δz] is the camera position of the imaging section 104, an angular difference [Δϕ, Δθ] is the installation angle, a position [x1, y1, z1] of the user with respect to the device center [0, 0, 0] of the image display device 100 is calculated as follows.

$$x1 = d1*\cos(\theta1-\Delta\theta)*\tan(\phi1-\Delta\phi) - \Delta x$$

$$y1 = d1*\tan(\theta1-\Delta\theta) - \Delta y$$

$$z1 = d1*\cos(\theta1-\Delta\theta)*\cos(\phi1-\Delta\theta) - \Delta z$$

FIG. 4 is an explanatory diagram that explains the configuration of the control section 110 included in the image display device 100 of the embodiment of the present invention. Within the control section 110, FIG. 4 explains configurations of the user position information storing section 117, the system optimization processing section 120 and the system control section 122 included in the control section 110. Hereinbelow, the configurations of the user position information storing section 117, the system optimization processing section 120 and the system control section 122 will be explained with reference to FIG. 3.

As shown in FIG. 4, the system optimization processing section 120 is configured by including an audio property optimization processing section 142, an image property optimization processing section 144, and a device direction optimization processing section 146. Further, the system control section 122 is configured by including an audio property control section 152, an image property control section 154, and a device direction control section 156.

The user position information storing section 117 stores user position information that is the calculation result of the position of the user with respect to the device center and the frontward axis of the image display device 100 by the user position information calculating section 134 of the viewing state analyzing section 116. The user position information stored in the user position information storing section 117 is sent to the system optimization processing section 120.

The audio property optimization processing section 142 of the system optimization processing section 120 calculates audio property control information for performing an audio property optimization process on the speaker section 108 of the image display device 100 based on the user position information sent from the user position information storing section 117, so as to optimize the audio property of the image display device 100 for the user at the desired position. The audio property control information calculated by the audio property optimization processing section 142 is sent to the audio property control section 152 of the system control section 122.

Figure 11:
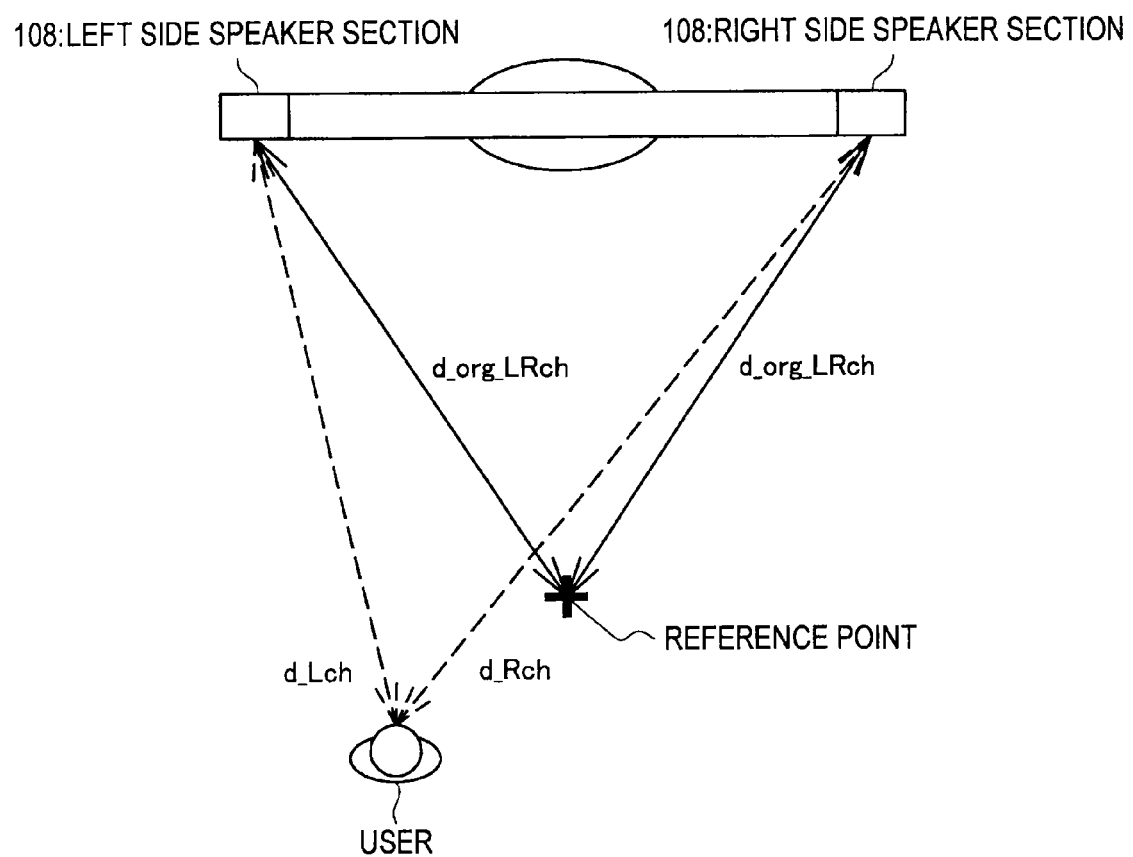
FIG. 11 is an explanatory diagram for explaining an optimization process of a volume balance.

As the audio property optimization process, there are a process for optimizing the volume balance of stereo sound output from the speaker section 108 on the left and right sides, and an optimization process related to a surround effect of the stereo sound output from the speaker section 108. Since a difference is generated in the volume balance of the left and right sides of the stereo sound output from the speaker section 108 depending on the position of the user, the optimization process optimizes gains on the left and right sides. For example, as shown in FIG. 11, a difference from a reference point is calculated as follows according to a principle that the volume of the stereo sound output from the speaker section 108 attenuates in inverse proportion to a square of distance; the difference (gain_dif) in the volume in the speaker section 108 at the left and right sides is calculated, and the volume balance on the left and right sides can be optimized.

$$gain\_Lch = 20*\log(d\_Lch/d\_org\_LRch)$$

$$gain\_Rch = 20*\log(d\_Rch/d\_org\_LRch)$$

$$gain\_dif = gain\_Rch - gain\_Lch = 20*\log(d\_Rch) - 20*\log(d\_Lch) = 20*\log(d\_Lch/d\_Rch)$$

Figure 12:
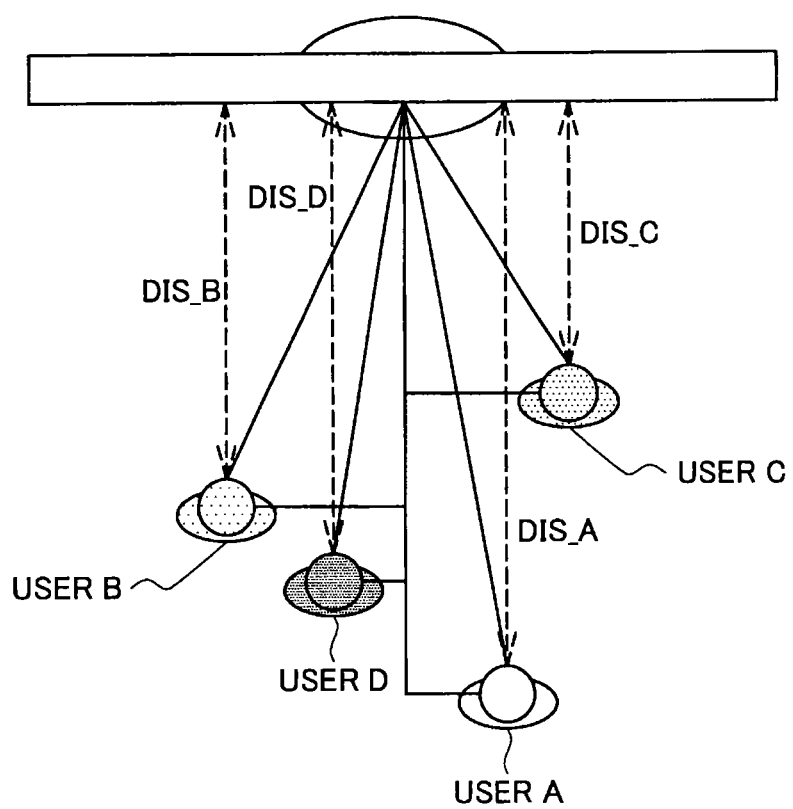
FIG. 12 is an explanatory diagram for explaining a calculation method of positions of center of balance of a user group.

Here, note that: gain_Lch
: the gain difference of Lch
gain_Rch
: the gain difference of Rch
d_org_LRch
: the distance from the left and right speaker sections to the reference point
d_Lch
: the distance from the Lch speaker section to the user
d_Rch
: the distance from the Rch speaker section to the user
gain_dif
: voltage gain difference of L/R Further, if a plurality of users is present, the left and right volume balance of the sound output from the speaker section 108 may be optimized with respect to a center of balance of that user group, or alternatively may optimize the left and right volume balance of the sound output from the speaker section 108 with priority for a particular user. As a method of calculating the center of balance of the user group, when a plurality of users, namely users A, B, C, and D as shown in FIG. 12 is present, the calculation can be performed as follows.

```
d_cent_dif
= 0;
temp_CAM_DIS
= 0;
if(CAM_AUDIENCE
!= 0){
for(int i=0;i <
CAM_AUDIENCE;i++){
d_cent_dif +=
CAM_DIS[i]* tan(CAM_HOR_ANGLE[i]* PI/180);
temp_CAM_DIS +=
CAM_DIS[i];
    }
  }
d_cent_dif
= d_cent_dif/CAM_AUDIENCE;
// return (use) value center of balance processed angle
CAM_DIS
= temp_CAM_DIS/CAM_AUDIENCE;
// return (use) value center of balance processed distance
```

Here, note that CAM AUDIENCE
: User within the imaging area of the imaging sections 104
CAM_HOR_ANGLE[0]
: Angle of user A
CAM_HOR_ANGLE[1]
: Angle of user B
CAM_HOR_ANGLE[2]

: Angle of user C
CAM_HOR_ANGLE[3]
: Angle of user D
CAM_DIS[0]
: distance of user A
CAM_DIS[1]
: distance of user B
CAM_DIS[2]
: distance of user C
CAM_DIS[3]
: distance of user D The image property optimization processing section 144 of the system optimization processing section 120 calculates image property control information with respect to the user at the desired position for performing the image property optimization process on the display panel 102 of the image display device 100 based on the user position information sent from the user position information storing section 117 that is for optimizing the image property of the image display device 100. The image property control information calculated by the image property optimization processing section 144 is sent to the image property control section 154 of the system control section 122.

As the image property optimization process, there are processes such as a gamma correction for optimizing an appearance of black, and a correction of color gain for complying with a color change.

For example, the gamma correction is performed as follows.

$$\gamma=2.2+\text{image quality correction}-0.1\times\text{user direction}$$

Further, for example, the correction of the color gain is performed as follows.

$$\text{ColorGain}=\text{User Color}+\text{image quality correction}\pm\alpha\times\text{user direction}$$

$$R(G,B)\text{ Gain}=R(G,B)\times\text{image quality correction}\pm\alpha\times\text{user direction}$$

Figure 13A:
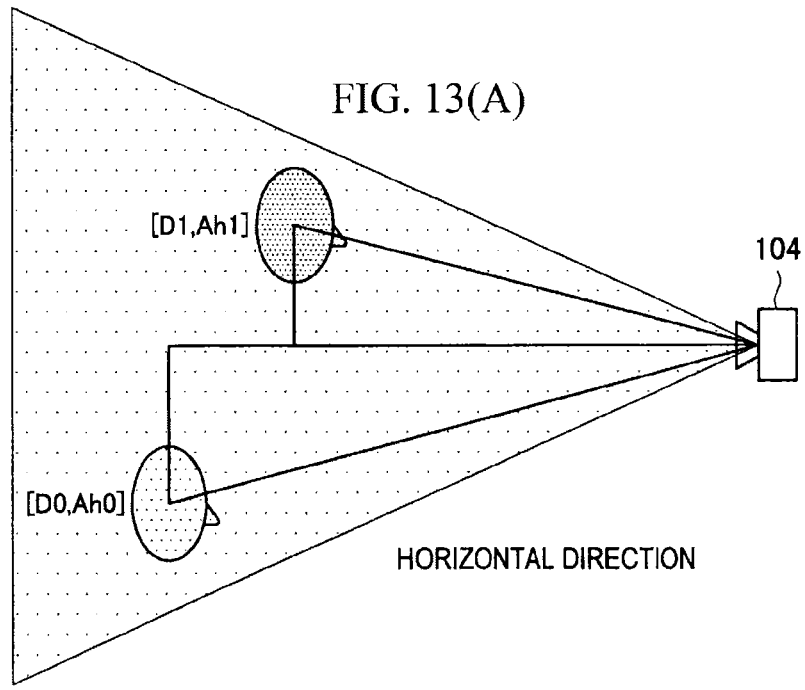
FIG. 13(A) is an explanatory diagram for explaining a position [D0, Ah0] of a user A and a position [D1, Ah1] of a user B in a horizontal direction.
Figure 13B:
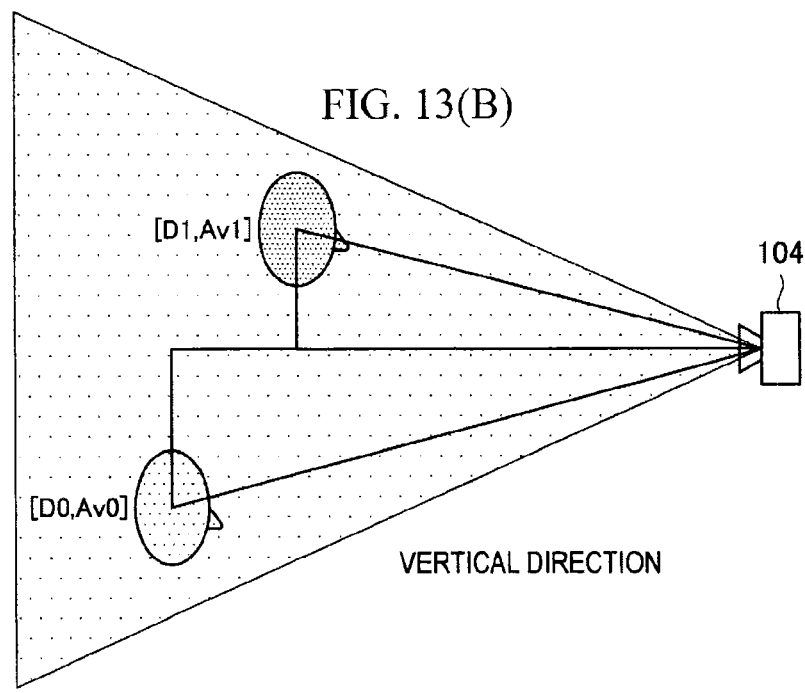
FIG. 13(B) is an explanatory diagram for explaining a position [D0, AV0] of the user A and a position [D, Av1] of the user B in a vertical direction.

Further, if the plurality of users is present, the gamma correction and the correction of the color gain can be performed on the center of balance of the user group, or alternately the gamma correction and the correction of the color gain can be performed with priority for a particular user. In assuming that a position of the user A is [D0, Ah0] and a position of the user B is [D1, Ah1] in the horizontal direction as shown in FIG. 13(A), and a position of the user A is [D0, AV0] and a position of the user B is [D, Av1] in the vertical direction as shown in FIG. 13(B), an average viewing angle correction coefficient and setting data for the system optimization process are calculated by the following formula.

$$\text{Average viewing angle correction coefficient}=\{(1/D0*(Ah0+Av0)+1/D1*(Ah1+Av1)+1/Dn*(Ahn+Avn))/n\}*\text{correction value}$$

$$\text{Setting data}=(\text{basic data})*\{1+(\text{correction value at the maximum viewing angle})*(\text{average viewing angle correction coefficient})\}$$

An average viewing angle gives weight to close-by users, and calculates an average of a horizontal angle and a vertical angle for a number of the users. A correction coefficient is calculated by multiplying the correction value to the average viewing angle, and an overall correction amount is calculated by multiplying the correction coefficient to the maximum correction value. The setting data is calculated by adding or subtracting the correction amount to or from the basic data (data with no correction: γ=2.2+image quality correction).

Further, in the optimization of the image property, since the optimal value varies depending on the age and sex of the user, the optimization process can be performed by using the attribute information such as the age and sex obtained from the image processing section in addition to the user position information. For example, a luminance correction of the display panel 102 is performed as follows.

$$\text{BackLight}=\text{basic setting value}*\text{correction value}$$

$$\text{Correction value}=10^\wedge(A*\log\text{ screen illumination}+B*\log\text{ viewing angle}+C*\log\text{ image average level}+D*\text{age})/\text{screen illumination}$$

Further, in an experiment, an optimal luminance is known to have a relationship with the screen illumination, viewing angle, image average luminance level, and age as follows.

$$\text{Log optimal luminance}=A*\log\text{ screen illumination}+B*\log\text{ viewing angle}+C*\log\text{ image average level}+D*\text{age}$$

The device direction optimization processing section 146 of the system optimization processing section 120 calculates device direction control information for performing a device direction optimization process to the mechanism section 109 of the image display device 100 with respect to the user at the desired position based on the user position information sent from the user position information storing section 117, for optimizing the device direction of the image display device 100. The device direction control information calculated by the device direction optimization processing section 146 is sent to the device direction control section 156 of the system control section 122.

As the device direction controlling process, if the mechanism section 109 is equipped with a swivel mechanism in the vertical and horizontal direction, the image display device 100 is rotated so that the frontward axis [0, 0] of the image display device 100 comes to be at the direction [φ1, θ1] of the user. Due to this, the display panel 102 of the image display device 100 can be optimized to a direction that is head-on as seen from the user.

The audio property control section 152 of the system control section 122 performs the audio property optimization process based on the audio property control information sent from the audio property optimization processing section 142. For example, the audio property control section 152 performs the control of the volume balance of the sound output from the speaker section 108 based on the audio property control information sent from the audio property optimization processing section 142.

The image property control section 154 of the system control section 122 performs the image property optimization process based on the image property control information sent from the image property optimization processing section 144. For example, the image property control section 154 performs the control of the imaging property of the display panel section 102 based on the image property control information sent from the image property optimization processing section 144.

The device direction control section 156 of the system control section 122 performs the device direction optimization process based on the device direction control information sent from the device direction optimization processing section 146. For example, the device direction control section 156 performs the control of the mechanism section 109 of the image display device 100 based on the device direction control information sent from the device direction optimization processing section 146.

As above, the configuration of the control section 110 included in the image display device 100 of the embodiment of the present invention has been explained with reference to FIG. 3 and FIG. 4. Next, the optimization process in accordance with the position of the user by the image display device 100 of the embodiment of the present invention will be explained.

[1-3. Optimization Process according to User Position]

Figure 8:
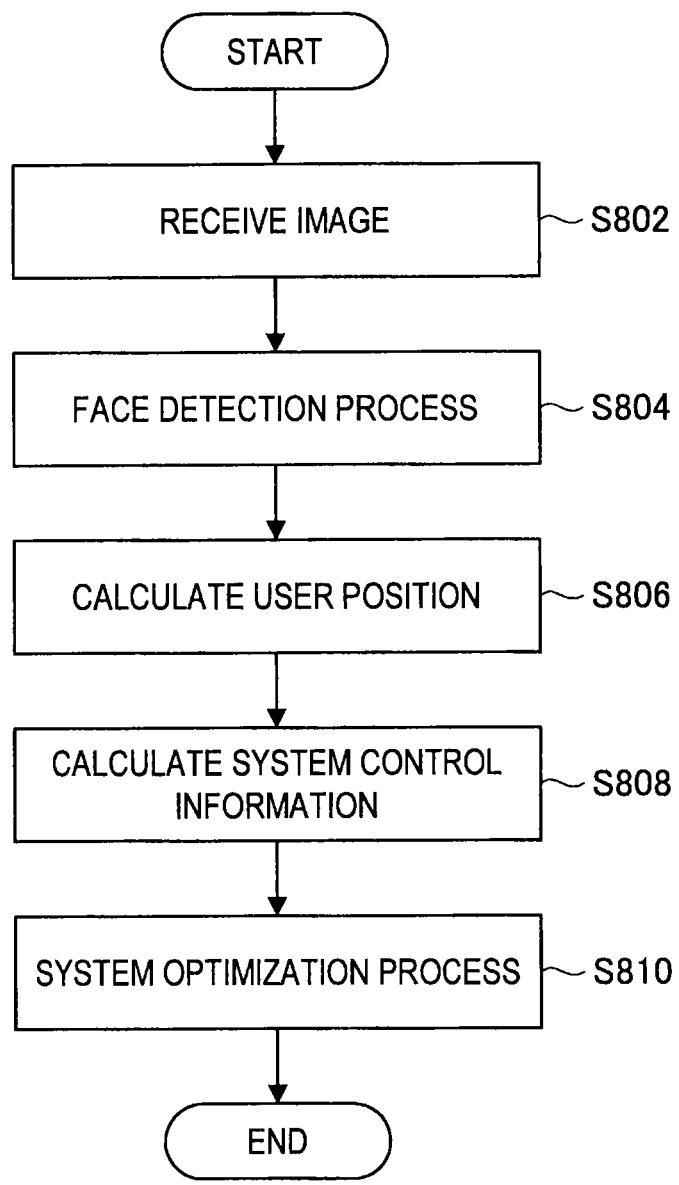
FIG. 8 is a flow diagram showing an example of an optimization process in accordance with a position of the user by the image display device 100 of the embodiment of the present invention.

FIG. 8 is a flow diagram showing an example of the optimization process in accordance with the position of the user by the image display device 100 of the embodiment of the present invention. Hereinbelow, the optimization process in accordance with the position of the user by the image display device 100 of the embodiment of the present invention will be explained with reference to FIG. 8.

In FIG. 8, firstly, when the imaging sections 104 of the image display device 100 starts taking an image, the image input section 112 of the control unit 110 receives the image taken by the imaging sections 104 (step S802).

Then, the image processing section 114 of the control section 110 performs the process of detecting the face included in the image received by the image input section 112 (step S804).

Then, the viewing state analyzing section 116 of the control section 110 calculates the relative position of the user with respect to the optical axis of the camera of the respective imaging sections 104 in the user direction/distance calculating section and calculates the user position with respect to the device center and the frontward axis of the image display device 100 in the user position information calculating section 134 (step S806).

Then, the system optimization processing section 120 of the control section 110 calculates system control information for performing the system optimization process for optimizing a state of the image display device 100 with respect to the user at the desired position based on the user position information calculated in step S806 (step S808). For example, in step S808, the system control information for performing the optimization of the volume balance of the sound output from the speaker section 108 on the left and right sides is calculated. Further, in step S808, the system control information for performing the process such as the gamma correction for optimizing the appearance of black and the correction of the color gain for complying with the color change is calculated. Further, in step S808, the system control information for performing the process for optimizing the device direction of the image display device 100 is calculated.

Then, the system control section 122 of the control section 110 performs the system optimization process based on the system control information calculated in step S808 (step S810), and ends this process.

By the optimization process according to the position of the user in FIG. 8, the state of the image display device 100 with respect to the user at the desired position can be optimized. For example, the left and right volume balance of the sound output from the speaker section 108 is optimized, so the user can watch the image display device 100 without feeling uncomfortable. Further, the appearance of black and the color change are optimized, so the user can satisfactorily watch the image displayed on the image display device 100. Further, the image display device 100 is optimized to the direction that is head-on to the user, so the user can satisfactorily watch the image displayed on the image display device 100.

[1-4. Optimization Process according to User Positions of One or More Users]

Figure 9:
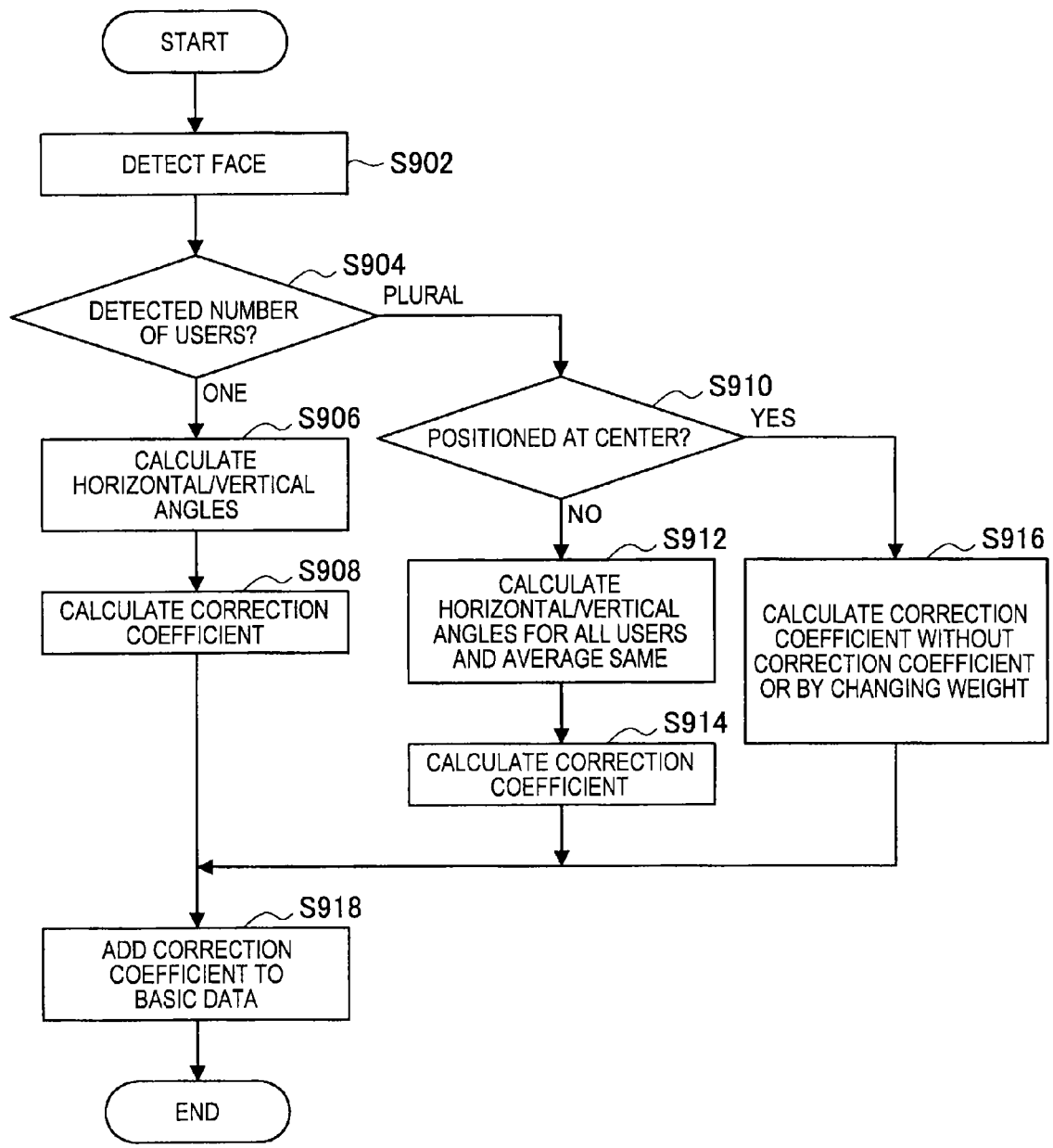
FIG. 9 is a flow diagram showing an example of an optimization process in accordance with positions of one or more users by the image display device 100 of the embodiment of the present invention.

Next, an optimization process in accordance with positions of one or more users by the image display device 100 of the embodiment of the present invention will be explained. FIG. 9 is a flow diagram showing an example of an optimization process in accordance with the positions of the one or more users by the image display device 100 of the embodiment of the present invention.

In FIG. 9, firstly, when the imaging sections 104 of the image display device 100 starts taking an image, the image input section 112 of the control unit 110 receives the image taken by the imaging section 104, and the image processing section 114 of the control section 110 performs the detection process of the face included in the image received by the image input section 112 and the like (step S902).

Then, the viewing state analyzing section 116 of the control section 110 receives a result of the face detection process by the image processing section 114, and determines whether a detected number of the user is one or more by using the result of the face detection by the image processing section 114 (step S904).

As a result of the determination of step S904, if the detected number of the user is one, the viewing state analyzing section 116 of the control section 110 calculates a horizontal angle and a vertical angle of the user (step S906).

Then, the system optimization processing section 120 of the control section 110 calculates a correction coefficient for the system control information for performing the system optimization process based on the horizontal angle and the vertical angle of the user calculated in step S906 (step S908).

As a result of the determination of step S904, if the detected number of the user is a plurality, the viewing state analyzing section 116 of the control section 110 determines whether the plurality of users is at a center of the image or not (step S910).

As a result of the determination of step S910, if the plurality of users is not at the center of the image (NO at step S910), the viewing state analyzing section 116 of the control section 110 calculates the horizontal angle, the vertical angle and a distance for respective ones of the plurality of users, and averages them (step S912). Further, in step S912, the horizontal angle, the vertical angle, and a distance may be calculated for respective ones of the plurality of users, and positions of center of balance for the plurality of users may be calculated.

Then, the system optimization processing section 120 of the control section 110 calculates the correction coefficient for the system control information for performing the system optimization process (step S914).

As a result of the determination of step S910, if the plurality of users is at the center of the image (YES at step S910), the system optimization processing section 120 of the control section 110 calculates the correction coefficient without the correction coefficient for the system control information for the system optimization process, or by changing a weight thereon (step S916).

After having calculated the correction coefficients in steps S908, S914, and S916, the system optimization processing section 120 of the control section 110 calculates the system control information by adding the correction coefficients to basic data of the system control information for the system optimization process (step S918), and ends the process.

By the optimization process according to the positions of the one or more users in FIG. 9, the state of the image display device 100 with respect to the plurality of users at the desired positions can be optimized.

[1-5. Optimization Process according to Ages of One or More Users]

Figure 10:
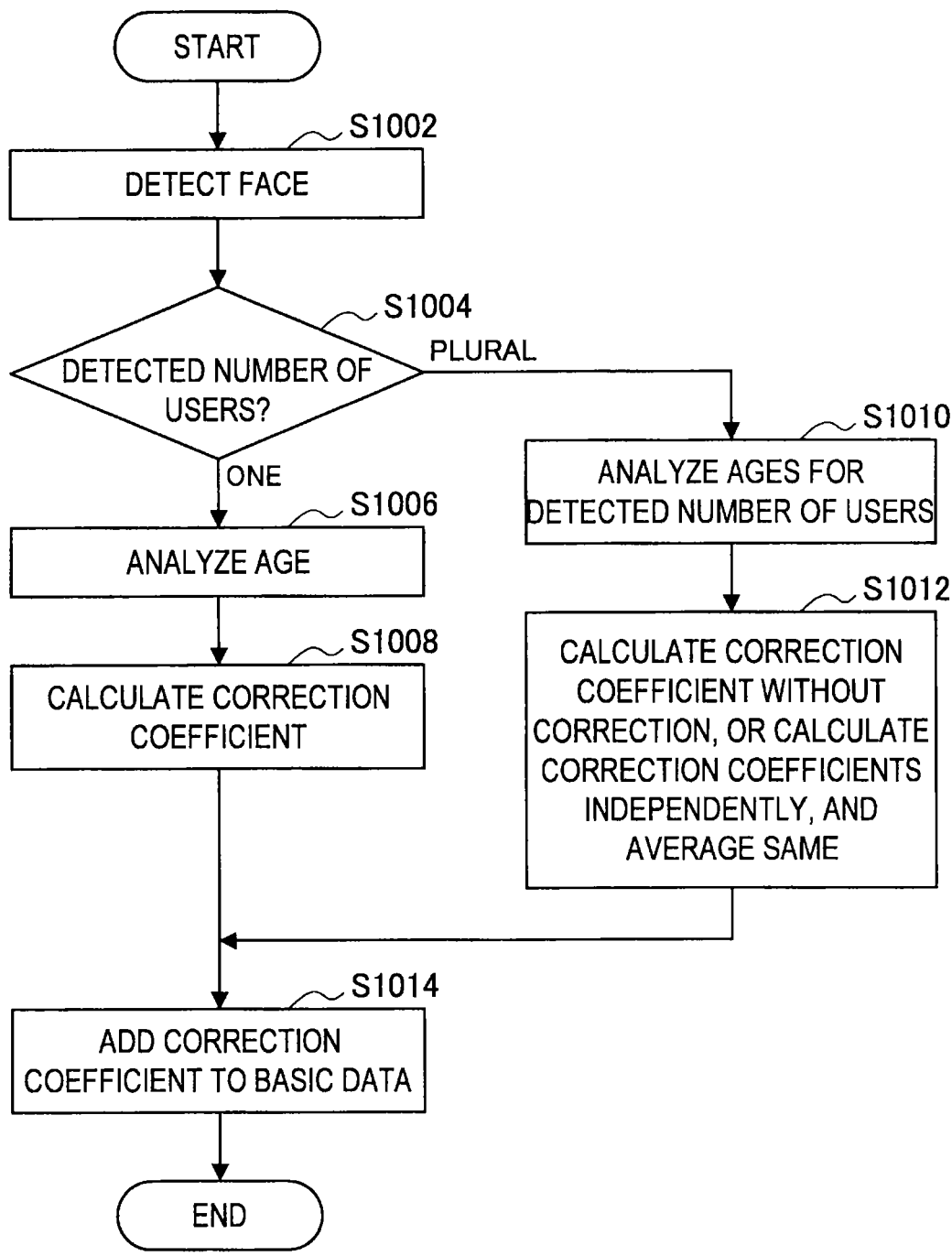
FIG. 10 is a flow diagram showing an example of an optimization process in accordance with ages of one or more users by the image display device 100 of the embodiment of the present invention.

Next, an optimization process in accordance with ages of the one or more users by the image display device 100 of the embodiment of the present invention will be explained. FIG. 10 is a flow diagram showing an example of the optimization process in accordance with the ages of the one or more users by the image display device 100 of the embodiment of the present invention.

In FIG. 10, firstly, when the imaging sections 104 of the image display device 100 starts taking an image, the image input section 112 of the control unit 110 receives the image taken by the imaging section 104, and the image processing section 114 of the control section 110 performs the detection process of the faces included in the image received by the image input section 112 and the like (step S1002).

Then, the viewing state analyzing section 116 of the control section 110 receives a result of the face detection process by the image processing section 114, and determines whether a detected number of the user is one or more by using the result of the face detection by the image processing section 114 (step S1004).

As a result of the determination of step S1004, if the detected number of the user is one, the viewing state analyzing section 116 of the control section 110 analyzes the age of the user (step S1006).

Then, the system optimization processing section 120 of the control section 110 calculates a correction coefficient for the system control information for the system optimization process based on an analysis result of the age in step S1006 (step S1008).

As a result of the determination of step S1004, if the detected number of the user is a plurality, the viewing state analyzing section 116 of the control section 110 analyzes the ages of the respective users (step S1010).

Then, the viewing state analyzing section 116 of the control section 110 calculates a correction coefficient without the correction of the system control information for the system optimization process, or calculates correction coefficients independently, and averages the same (step S1012).

After steps S1008, S1012, the system optimization processing section 120 of the control section 110 calculates the system control information by adding the correction coefficient to the basic data of the system control information for the system optimization process (step S1014), and ends the process.

By the optimization process according to the ages of the one or more users in FIG. 10, the state of the image display device 100 with respect to the plurality of users of various ages can be optimized.

Further, in the embodiment, the system optimization processing section 120 may calculate system control information for optimizing a letter size of a GUI displayed on the display panel section 102 based on the user position information. The system control information calculated by the system optimization processing section 120 is sent to the system control section 122, and the optimization process for optimizing the letter size of the GUI displayed on the display panel section 102 is performed by the system control section 122.

Figure 14A:
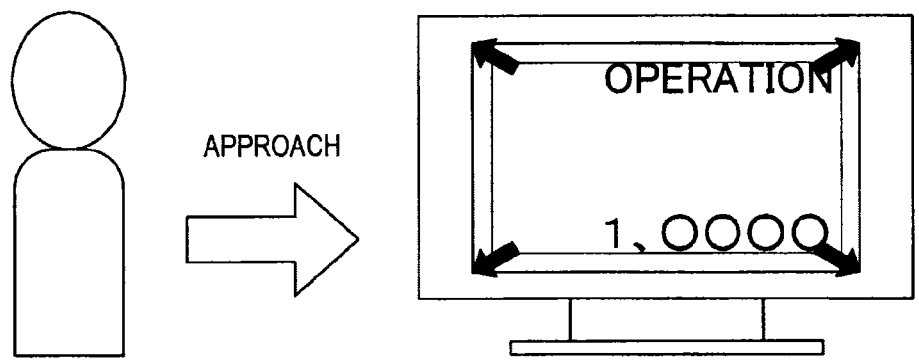
FIG. 14(A) and FIG. 14(B) are explanatory diagrams for explaining an optimization process of a letter size of a GUI.

As the optimization process of the letter size of the GUI, as shown in FIG. 14(A), there is a process to enlarge the letter size of the GUI displayed on the display panel section 102 when the user approaches the image display device 100. In this case, the letter size of the GUI is enlarged when the user approaches the image display device 100, and the letter size of the GUI is reduced when the user backs away from the image display device 100. For example, when the letter size of the GUI is small and causing difficulty in reading, the letter size of the GUI increases as the user approaches, whereby the user can easily recognize the GUI.

Figure 14B:
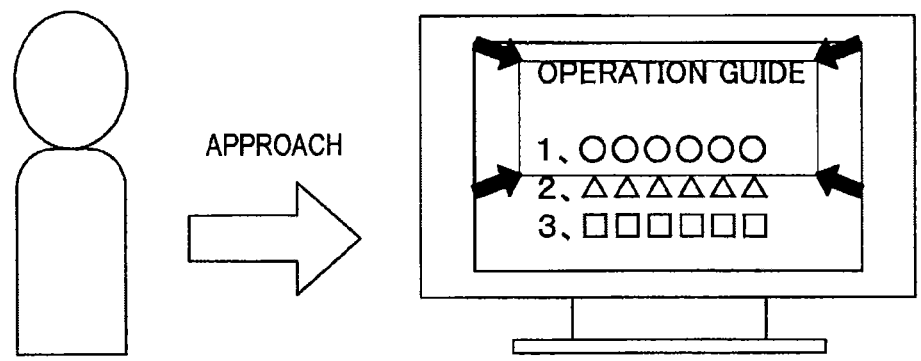

Further, as the optimization process of the letter size of the GUI, as shown in FIG. 14(B), there is a process to refine information to be displayed, that is, to increase information amount, by reducing the letter size of the GUI displayed on the display panel section 102 when the user approaches the image display device 100. In this case, the letter size of the GUI is reduced and the information to be displayed is increased when the user approaches the image display device 100, and the letter size of the GUI is increased when the user backs away from the image display device 100. For example, if the user is far away when a program list is displayed on the display panel section 102, the amount of information is reduced by enlarging the letter size, and when the user approaches, the amount of information is increased by reducing the letter size.

Figure 15B:
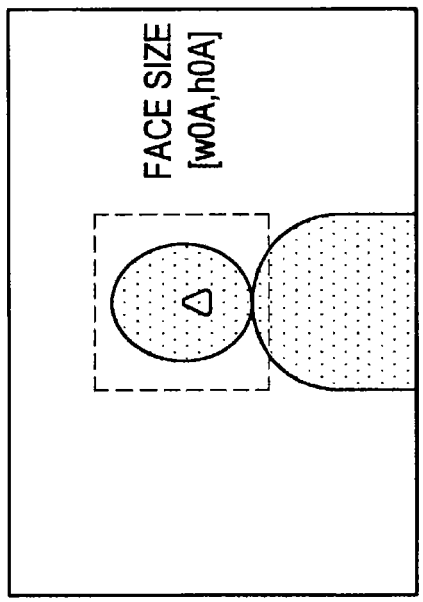
FIG. 15(A) to FIG. 15(C) are explanatory diagrams for explaining a correction method of the reference face size [w0, h0] at the reference distance d0 in a calculation of the user distance.
Figure 15C:
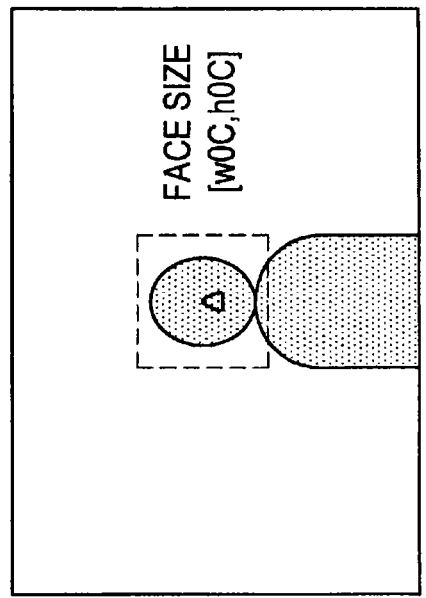
Figure 15A:
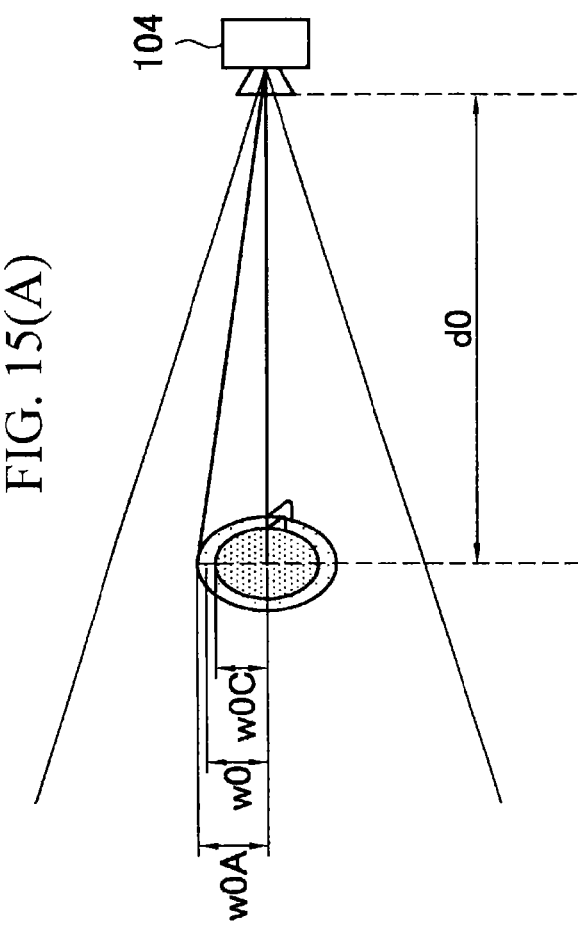

Further, in the present embodiment, as shown in FIGS. 15(A) to 15(C), in the calculation of the viewing positions of the users, the variation in the face size may be corrected by using the reference face size [w0, h0] at the reference distance d0 in a following correction table. For example, from the attribute information such as the user's age, a data table of an average face size of that age is predeterminedly stored; for example, if the user is a child, the reference face size [w0, h0] may be made to be a face size [w0C, h0C] that is smaller than the reference face size shown in FIG. 15(C), and if the user is an adult, the reference face size [w0, h0] may be made to be a face size [w0A, h0A] that is larger than the reference face size shown in FIG. 15(B).

Further, in the present embodiment, in the calculation of the viewing position of the user, in predeterminedly registering the user who uses the image display device 100 in the image display device 100, for example a family of an installation site of the image display device 100, the face size of each user may be registered as a data table. Due to this, the reference face size can be changed for each user. A method to register the face size for each user can be realized by taking images together with distance information in cooperation with another distance sensor (not shown), taking images by guiding the user to a predetermined distance, or taking images at the same distance as a scale to be the reference.

Further, in the present embodiment, even if the user is out of the imaging area of the imaging section 104 by estimating the position of the user outside the imaging area from a chronological transition information, the aforementioned system optimization process can be continued.

Further, in the present embodiment, in the system optimization process, an appropriate time constant may be set according to a viewing environment of the user. Due to this, even if the user performs a steep positional transition, the system optimization process can be continued.

Note that, the aforementioned series of processes may be performed by hardware, or may be performed by software. In having the software to perform the series of processes, a program configuring that software is installed from a program storing medium to a computer installed in a dedicated hardware, or for example to a general purpose personal computer that is capable of performing various functions by installing various programs.

The preferred embodiment of the present invention has been described above with reference to the appended drawings, but the present invention is not limited thereto. It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Image display device
102 Display panel section
104 Imaging section
106 Sensor section
108 Speaker section
109 Mechanism section
110 Control section
112 Image input section
114 Image processing section
116 Viewing state analyzing section
117 User position information storing section
118 Viewing state recording section
120 System optimization processing section
122 System control section
132 User direction/distance calculating section
134 User position information calculating section
142 Audio property optimization processing section
144 Image property optimization processing section
146 Device direction optimization processing section
152 Audio property control section
154 Image property control section
156 Device direction control section
200 Data collection server

The invention claimed is:

1. An information processing device, comprising:
a sensor that detects a user within a detectable range from the sensor; and
processing circuitry that
detects a face of the user based on image data captured by the sensor;
calculates system control information for optimizing an output of a display system based on a respective position of the user detected by the sensor;
analyzes the face of the user to determine an age of the user;
calculates a correction coefficient to correct the system control information according to the age of the user;
corrects the system control information based on the correction coefficient; and
optimizes the output of the display system based on the corrected system control information.

2. The information processing device according to claim 1, wherein the processing circuitry calculates the system control information to optimize a sound output of the display system based on the respective position of the user detected by the sensor.

3. The information processing device according to claim 2, wherein the processing circuitry calculates the system control information to optimize a volume balance of the sound output from an audio output of the display system based on the respective position of the user detected by the sensor.

4. The information processing device according to claim 2, wherein the processing circuitry calculates the system control information to adjust an output direction of the sound output of the display system based on the respective position of the user detected by the sensor.

5. The information processing device according to claim 1, wherein
the sensor detects a plurality of users within the detectable range from the sensor, and
the processing circuitry calculates the system control information to optimize the output of the display system based on respective positions of each of the plurality of users detected by the sensor.

6. The information processing device according to claim 1, wherein the processing circuitry calculates the system control information to optimize an image property of the output of the display system based on the respective position of the user detected by the sensor.

7. The information processing device according to claim 1, wherein the processing circuitry calculates the system control information to optimize a display content that is output by the display system based on the respective position of the user detected by the sensor.

8. The information processing device according to claim 1, wherein
the processing circuitry calculates the system control information to modify a display direction of the display system based on the respective position of the user detected by the sensor, and
the display system modifies the display direction of the display system according to the system control information.

9. The information processing device according to claim 1, wherein the processing circuitry further
calculates a position of the user according the face of the user, and
calculates the system control information for optimizing the output of the display system based on calculated position of the user.

10. The information processing device according to claim 1, wherein the processing circuitry, to correct the system control information based on the correction coefficient, adjusts a size of the output of the display system.

11. The information processing device according to claim 1, wherein the processing circuitry, to correct the system control information based on the correction coefficient, adjusts a brightness of the output of the display system.

12. The information processing device according to claim 1, wherein the processing circuitry further
calculates the system control information to optimize a sound output of the display system based on the respective position of the user detected by the sensor, and
adjusts a volume of the sound output of the display system to correct the system control information based on the correction coefficient.

13. The information processing device according to claim 1, wherein
the output of the display system includes a graphical user interface, and
the processing circuitry, to correct the system control information based on the correction coefficient, adjusts a position of the graphical user interface output by the display system.

14. The information processing device according to claim 1, wherein
the output of the display system includes a graphical user interface, and
the processing circuitry, to correct the system control information based on the correction coefficient, adjusts a brightness of the graphical user interface output by the display system.

15. The information processing device according to claim 1, wherein the processing circuitry sets a time constant based on the respective position of the user.

16. A controlling method, comprising:
   detecting, by a sensor, a user within a detectable range from the sensor;
   detecting a face of the user based on image data captured by the sensor;
   calculating, by processing circuitry, system control information to optimize an output of a display system based on a respective position of the user detected by the sensor;
   analyzing the face of the user to determine an age of the user;
   calculating a correction coefficient to correct the system control information according to the age of the user;
   correcting, by the processing circuitry, the system control information based on the correction coefficient; and
   optimizing, by the processing circuitry, the output of the display system based on the corrected system control information.

17. The controlling method according to claim 16, further comprising:
   setting, by the processing circuitry, a time constant based on the respective position of the user.

18. A non-transitory computer readable medium storing computer readable instructions that, when executed by a processor, cause the processor to:
   control a sensor to detect a user within a detectable range from the sensor;
   detect a face of the user based on image data captured by the sensor;
   calculate system control information to optimize an output of a display system based on a respective position of the user detected by the sensor;
   analyze the face of the user to determine an age of the user;
   calculate a correction coefficient to correct the system control information according to the age of the user;
   correct the system control information based on the correction coefficient; and
   optimize the output of the display system based on the corrected system control information.

* * * * *